United States Patent [19]
Loginov

[11] Patent Number: 6,014,738
[45] Date of Patent: Jan. 11, 2000

[54] METHOD FOR COMPUTING A DIFFERENCE IN A DIGITAL PROCESSING SYSTEM

[75] Inventor: Vadim Loginov, Moscow, Russian Federation

[73] Assignee: Sun Microsystems, Inc., Palo Alto, Calif.

[21] Appl. No.: 08/880,627

[22] Filed: Jun. 23, 1997

Related U.S. Application Data

[62] Division of application No. 08/879,420, Jun. 20, 1997, Pat. No. 5,894,568.

[51] Int. Cl.[7] .................................................... G06F 9/302
[52] U.S. Cl. ............................................................ 712/223
[58] Field of Search .................................... 712/223, 221, 712/224

[56] References Cited

U.S. PATENT DOCUMENTS

| | | | |
|---|---|---|---|
| 4,794,531 | 12/1988 | Morishita et al. | 382/132 |
| 4,997,733 | 3/1991 | Carleer et al. | 430/7 |
| 5,185,810 | 2/1993 | Freischald | 382/100 |
| 5,469,536 | 11/1995 | Blank | 345/431 |
| 5,506,676 | 4/1996 | Hendler | 356/237.1 |
| 5,513,016 | 4/1996 | Inque | 358/454 |

OTHER PUBLICATIONS

Sun Microsystems "The UltraSPARC Processor—Technology White Paper; The UltraSPARC Architecture" Nov. 14, 1995.

*Primary Examiner*—David Y. Eng
*Attorney, Agent, or Firm*—D'Alessandro & Ritchie

[57] ABSTRACT

According to a presently preferred embodiment of the present invention, a method for processing a incoming signal comprising the steps of selecting from a first signal a first plurality of bits of signal information to be processed, selecting from a second signal a second plurality of bits of signal information to be processed, reading the first plurality of bits of signal information into contiguous memory space so as to form a first word, reading the second plurality of bits of signal information into contiguous memory space so as to form a second word, causing a first logical AND operation to be performed on the second word with a mask, causing a first logical OR operation between the first word and the complement of the mask, causing a first EXCLUSIVE OR operation between the first word and the complement of the second word, causing a second logical AND operation between the results of the first EXCLUSIVE OR operation and the complement of the mask, subtracting the results of the first logical AND operation from the results of the first logical OR operation, and causing a second EXCLUSIVE OR operation to be performed on said results of the first subtraction operation with the results of the second AND operation.

4 Claims, 3 Drawing Sheets

METHOD FOR COMPUTING A DIFFERENCE IN A DIGITAL PROCESSING SYSTEM

RELATED U.S. APPLICATION DATA

This application is a continuation of co-pending U.S. patent application Ser. No. 08/879,420, filed Jun. 20, 1997, now U.S. Pat. No. 5,894,568, issued Apr. 13, 1999.

BACKGROUND OF THE INVENTION

1. Field of the Invention

The present invention relates to an apparatus useable for the real-time processing of video signals and other signals requiring digital processing.

2. The Background Art

With the rise in demand for increasingly complex electronic devices, such as computers performing video signal processing functions, it is often required that large quantities of data be manipulated by common operations, to lighten or darken an image, merge two images together, etc.

Signals requiring manipulation often contain a great deal of information, such as when an NTSC signal is being operated upon to produce various effects. A digital NTSC signal produces approximately 10.4 million pixels per second, and each pixel contains information for three colors, red, green, and blue. Thus, a digital NTSC signal results in more than 31 million pieces of digital data per second.

A typical computer CPU speed of 200 MHz having to process more than 30 million pieces of digital video data per second, results in less than seven CPU clock cycles available each second for processing each color component for each pixel. In order to provide a smooth transition during real-time video processing, it is necessary that processing of each frame be completed prior to its display. Thus, speed of processing is extremely important in real-time signal processing applications.

In modern day computers, memory operations are the slowest operations performed, with the typical read or store operation requiring a full clock cycle in which to be executed. With the number of operations being performed on a real time video signal as seen above, it is critical that even the most simple operations be performed in the most efficient manner. However, signal processing systems, though useful for their intended purposes, often do not optimize processing functions so that memory operations are minimized. It would therefore be beneficial to provide a signal processing system and methods for its use which perform specialized processing functions while minimizing the number of transfers into and out of memory.

In addition to limiting the number of memory operations performed, it is often desirable to reduce the number of discrete operations performed in a given period of time. Typically, repetitive operations are performed sequentially rather than in parallel. Performing signal processing operations on many bytes of simultaneously often reduces the amount of time required to perform those signal processing operations on the entire set of data as compared to the amount of time which might be required to perform those same operations when performed sequentially. It would therefore be beneficial to provide an apparatus and method which processes several bytes of data simultaneously.

In video processing operations, such as when decoding a video signal using the MPEG-II compression standard, or when scaling or rotating images, it is necessary to combine the incoming signal being processed with other internally generated signal data in order to achieve a given result. The present invention is only concerned with the difference of two signals when the overflow that may result is ignored, such as when subtracting the angular component of one vector from another.

In the prior art, 8-bit signal information from the incoming signal, such as pixel information, was subtracted from other 8-bit information, one 8-bit byte at a time. This method, while use for its intended purposes, utilizes the processor inefficiently, and fails to optimize memory operations.

In the discussion that follows, memory refers to any memory used by a Central Processing Unit to perform operations. The data being manipulated is typically real-time graphical image data, but may instead be any type of signal data requiring similar processing.

To illustrate the method of the prior art, a difference will be computed using a first set of four 8-bit bytes of signal data such as pixel information and subtracting from it a second set of four 8-bit bytes, resulting in a difference output.

FIG. 1 is a flow chart of the prior art method of computing a difference of one set of signal data from another set of signal data, each set comprising four 8-bit bytes each.

Referring to FIG. 1, at step 10, a data byte from the first group of signal data is loaded into memory. At step 12, a data byte from the second group of data is loaded into memory. Step 14 then subtracts the data byte in the second group from the data byte from the first group, ignoring any overflow condition. The method proceeds at step 16 when the processor causes the result of step 16 to be written into memory. The method continues at step 18 where it is determined if all four differences have been computed. If not, the method proceeds again with step 10. If yes, the method ends.

In order to compute the difference of the two signals as seen above, one memory operation was required for the loading of each data byte, for a total of eight load operations. A total of four subtraction operations were required to compute the differences, and a total of 4 store operations were required to store each result into memory. Since each memory operation takes approximately one clock cycle to complete, the entire method of computing the differences of the two signals using the prior art method requires a minimum of 16 operations being performed in no less than twelve clock cycles.

OBJECTS AND ADVANTAGES OF THE INVENTION

An object and advantage of the present invention is to provide a signal processing apparatus and methods for its use which perform specialized processing functions while optimizing the use of memory operations.

A second object and advantage of the present invention is to provide an apparatus and method which processes several bytes of data simultaneously, operating on each byte identically.

These and many other objects and advantages of the present invention will become apparent to those of ordinary skill in the art from a consideration of the drawings and ensuing description of the invention.

SUMMARY OF THE INVENTION

According to a presently preferred embodiment of the present invention, a method for processing a incoming signal comprising the steps of selecting from a first signal a first plurality of bits of signal information to be processed, selecting from a second signal a second plurality of bits of signal information to be processed, reading the first plurality of bits of signal information into contiguous memory space so as to form a first word, reading the second plurality of bits of signal information into contiguous memory space so as to form a second word, causing a first logical AND operation to be performed on the second word with a mask, causing a first logical OR operation between the first word and the complement of the mask, causing a first EXCLUSIVE OR operation between the first word and the complement of the second word, causing a second logical AND operation between the results of the first EXCLUSIVE OR operation and the complement of the mask, subtracting the results of the first logical AND operation from the results of the first logical OR operation, and causing a second EXCLUSIVE OR operation to be performed on said results of the first subtraction operation with the results of the second AND operation.

DESCRIPTION OF A PREFERRED EMBODIMENT.

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
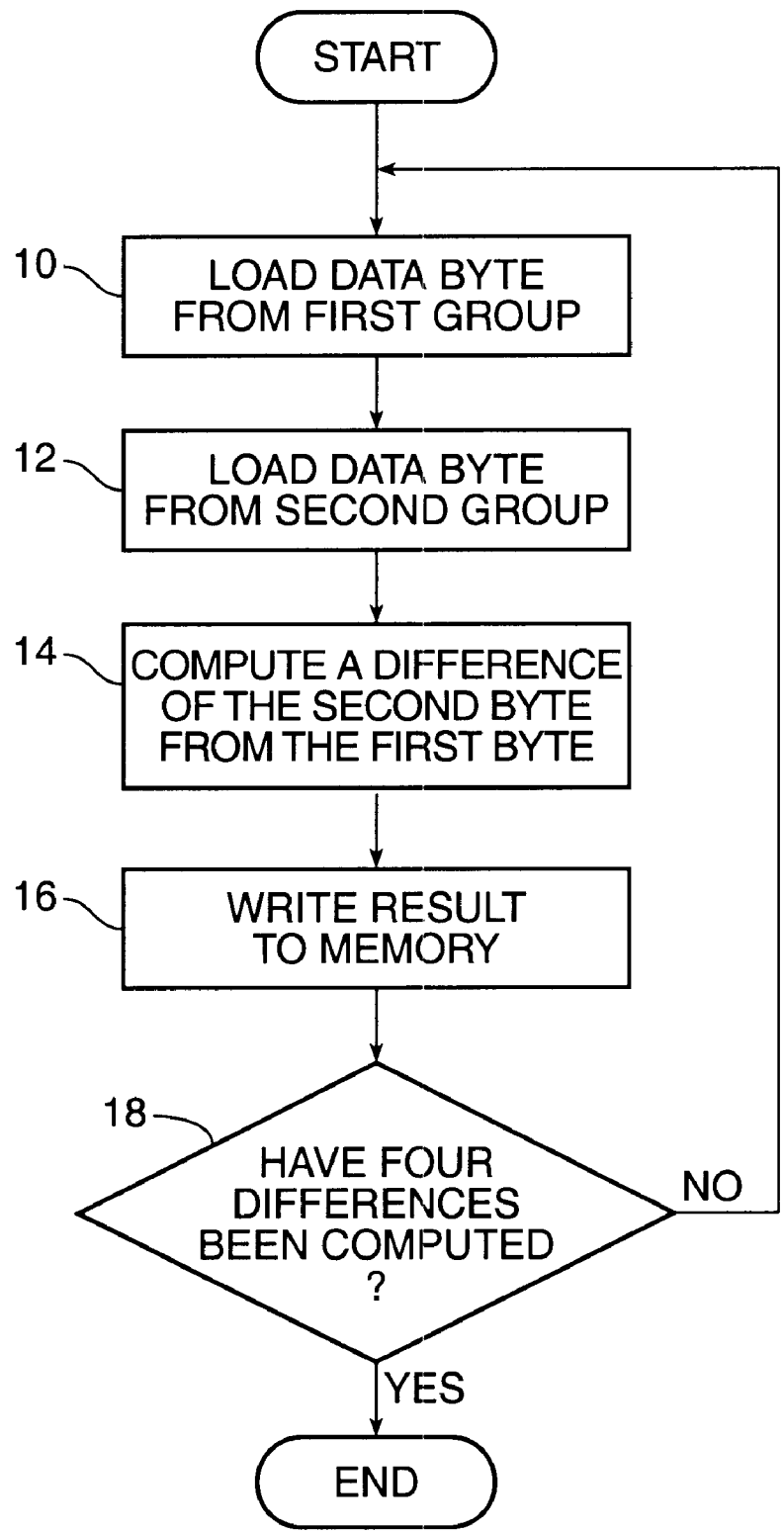
FIG. 1 is a flow chart of the prior art method of computing a difference of one set of signal data from another set of signal data, each set comprising four 8-bit bytes each.
Figure 2:
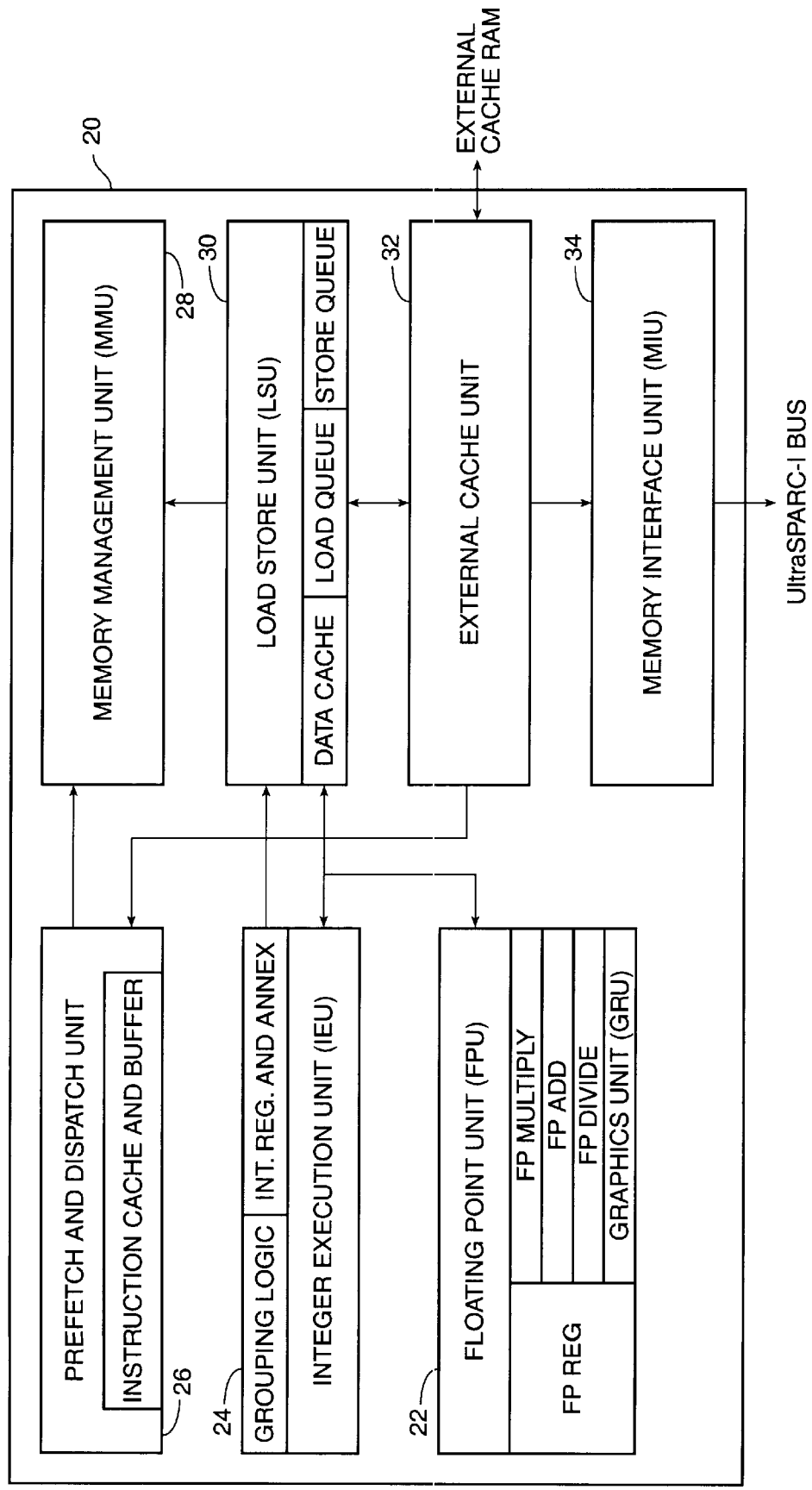
FIG. 2 is a block diagram of a representative Central Processing Unit utilizing the present invention.

FIG. 2 is a block diagram of a representative Central Processing Unit utilizing the present invention.

Referring to FIG. 2, a Central Processing Unit (CPU) 20 is presented which comprises a Floating Point Unit 22, an Integer Execution Unit 24, a Prefetch and Dispatch Unit 26, a Memory Management Unit 28, a Load Store Unit 30, an External Cache Unit 32, and a Memory Interface Unit 34.

In the processor 20 utilized in a presently preferred embodiment, logical operations are able to be performed both in Integer Execution Unit 24 and in Floating Point Unit 22. Both of these subsections of processor 20 contain specialized instruction sets for performing logical operations as required.

As discussed earlier, due to the large volume of signal information required to be processed, it is necessary that processing operations be performed as quickly as possible. Memory operations performed by Memory Management Unit 28 which require a full clock cycle to complete are minimized by the present invention. As a result, the presently preferred embodiment of the present invention described herein computes the difference of two distinct groups of four 8-bit data bytes each, in approximately three clock cycles, as compared to no less than twelve clock cycles using the prior art method, resulting a throughput increase of approximately three hundred percent over the prior art.

Those of ordinary skill in the art will readily recognize that the construction of logic circuits performing bitwise exclusive OR operations, bitwise OR operations, bitwise AND operations, and subtraction operations are well-known in the art. These construction details known in the art are not described herein in order to avoid overcomplicating the disclosure.

Figure 3:
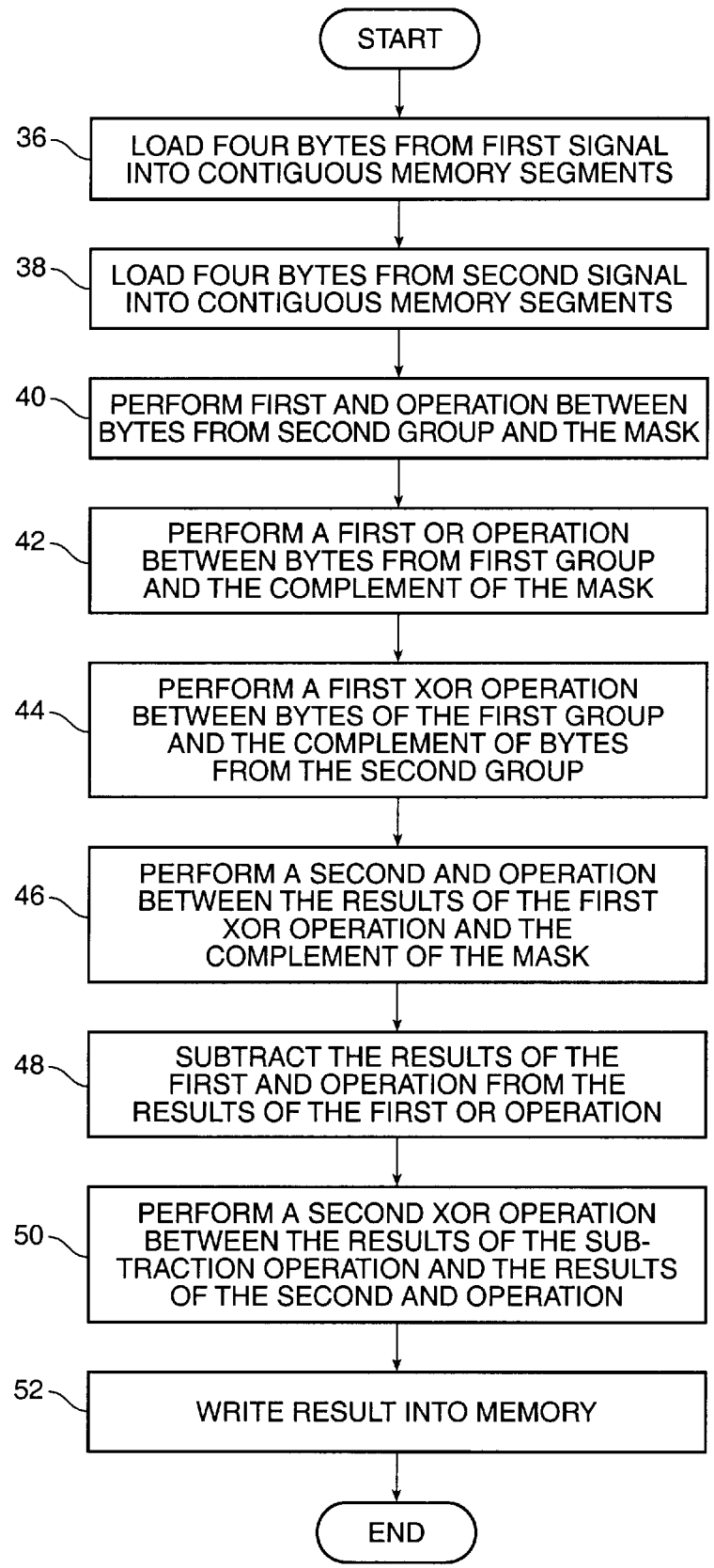
FIG. 3 is a flow chart depicting steps in a method of a presently preferred embodiment of the present invention.

FIG. 3 is a flow chart depicting steps in the method of a presently preferred embodiment of the present invention.

Referring to FIG. 3, at step 36, four data bytes, each comprising an equal number of bits from the first signal, are loaded into contiguous bits of memory, thus forming a first "word". In a presently preferred embodiment, the best throughput increases have been found to occur when each of the four signal data bytes comprises 8-bits, thus forming a 32 bit word at step 36. However, as will be appreciated by those of ordinary skill in the art, the present invention may be practiced using other numbers of signal data bytes. Furthermore, although each data byte must comprise the same number of bits, the present invention may be readily adapted to utilize signal data bytes comprising any number of bits.

At step 38, four data bytes from the second signal are loaded into contiguous bits of memory, thus forming a second word. The four data bytes from the second signal comprise the same number of bits each, and this same number of bits is the same number of bits making up each of the four bytes within the previously described first word.

After loading the signal data into memory, at step 40, the processor performs a bitwise AND operation between the previously formed second word and a mask. The mask comprises an equal number of bits as found in the first word, and all bits in the mask are set high, e.g. to "1", except for those positions corresponding to the most significant bit (MSB) of each of the four bytes making up the first word, which are set low, e.g. set to a "0". Thus, if the four bytes making up the first word are each 8-bit bytes, as they are in a presently preferred embodiment, then the bit positions corresponding to the MSB are positions 8, 16, 24, and 32, and the mask will comprise a word represented in hexadecimal as 0x7F7F7F7F. As another example, if the four bytes making up the first word are each five bits in length, then the MSB positions in the mask are positions 5, 10, 15, and 20, and the bits in those positions would be set to a zero while the bits in all other bit positions would be set to a "1". Those of ordinary skill in the art will readily recognize that the notation used above for the mask describes a 32-bit number with the value "7F7F7F7F".

At step 42, the processor performs a first logical OR operation between the previously formed first word and the complement of the mask. The complement of the mask word is formed by changing the value of each bit in the mask to its alternate state. Since each bit must either be "on", i.e. set to 1, or "off" i.e. set to 0, each bit that was a "0" when creating the mask will now be a "1" and each bit that was a "1" when creating the mask will now be a "0". Thus, if all four signal data bytes forming the first word are 8-bit bytes, the complement of the mask will comprise a "1" in bit positions 8, 16, 24, and 32, and all other bit positions will contain a "0". In this case, as in the preferred embodiment, the complement of the mask word is represented in hexadecimal as 0x80808080. Again, this notation describes a 32-bit word with a value of "80808080".

At step 44, a first exclusive OR operation is performed between the previously formed first word and the complement of the previously formed second word. The complement of the first word is formed by changing the value of each bit in the first word to its alternate state. Since each bit must either be "on", i.e. set to 1, or "off" i,e, set to 0, each bit that was a "0" when creating the first word will now be a "1" and each bit that was a "1" when creating the first word will now be a "0".

At step 46, a second bitwise AND operation is performed between the results of the first EXCLUSIVE OR operation performed at step 44 and the complement of the mask.

At step 48, a subtraction operation is performed wherein the results of the first bitwise AND operation previously performed at step 40 are subtracted from the results of the first bitwise OR operation previously performed at step 42.

At step 50, a second EXCLUSIVE OR operation is performed between the results of the subtraction operation previously performed at step 48 and the results of the second bitwise AND operation previously performed at step 46.

The method then proceeds in step 52 by writing the results of step 50 into memory as the next four succeeding bytes in the output signal. Step 52 is optional, and may not be required to be performed if the present invention is combined with other processing steps. In this case, the results of step 50 may be further used in another way, thus obviating the necessity of writing the result to memory.

Recall that the prior art method was accomplished in approximately thirteen processor clock cycles during which eight memory read operations and four memory write operations take place. Additional branching and compare operations in the prior art method add at least one more clock cycle, resulting in a total clock cycles for that method of thirteen or more.

The present invention allows the same result to be achieved in approximately three processor clock cycles. This is because only two memory read operations take place, and only one optional memory write operation takes place. Due to the construction of the architecture of the preferred embodiment, several logical operations may be performed on the same data at once, with three of four logical operations being able to be performed in the same clock cycle.

Alternative embodiments to the present invention include embedding the steps of the method of the present invention into a Field Programmable Gate Architecture (FPGA) using techniques which are well-known in the art, or using an integrated circuit design program such as VHDL to describe the method, thus hard coding the method described earlier into an application-specific integrated circuit (ASIC). The skill necessary to perform such embedding and hard coding is well-known to those of ordinary skill in the art. Therefore, the details of programming an FPGA or designing an ASIC will not be included here in order to avoid overcomplicating the disclosure.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. In a computer having a memory and an incoming signal, a method for processing the incoming signal comprising:

packing a first plurality of integers into contiguous memory space to produce a first 32-bit word, wherein each integer has a defined number of bits between one and eight;

packing a second plurality of integers into contiguous memory space to produce a second 32-bit word, wherein each integer has said defined number of bits;

replicating said first plurality of integers into contiguous memory space to produce a first 32-bit mask with a third plurality of integers, said first plurality of integers having a most significant bit (MSB) for each byte in said first 32-bit word forming an MSB plurality of integer positions, said first 32-bit mask having said MSB plurality of integer positions and a non-MSB plurality of integer positions corresponding to the remaining bits of each byte in said first 32-bit word and setting each bit in said MSB plurality to low and each bit in said non-MSB plurality to high in said 32-bit mask;

conducting a first bitwise AND of said second 32-bit word with said 32-bit mask to produce a first result;

conducting a first bitwise OR of said first 32-bit word with the compliment of said first 32-bit mask to produce a second result;

conducting a first EXCLUSIVE OR of said first 32-bit word and the compliment of said second 32-bit word to produce a third result;

conducting a second bitwise AND of said third result and the compliment of said compliment of said 32-bit mask to produce a fourth result;

subtracting said second result from first result to produce a fifth result; and conducting a second EXCLUSIVE OR of said fifth result and said fourth result to produce a sixth result.

2. A method according to claim 1 further comprising:

writing said sixth result into memory as a set of four succeeding bytes.

3. A method according to claim 1 wherein said first plurality of integers and said second plurality of integers each comprise four 8-bit groups of signal information.

4. A method according to claim 1 wherein said first plurality of integers and said second plurality of integers each comprise two 16-bit groups of signal information.

* * * * *